Oct. 29, 1957
R. H. GOODALE
2,811,367
WHEELED FOLDABLE CARRIER
Filed Nov. 15, 1955
3 Sheets-Sheet 1
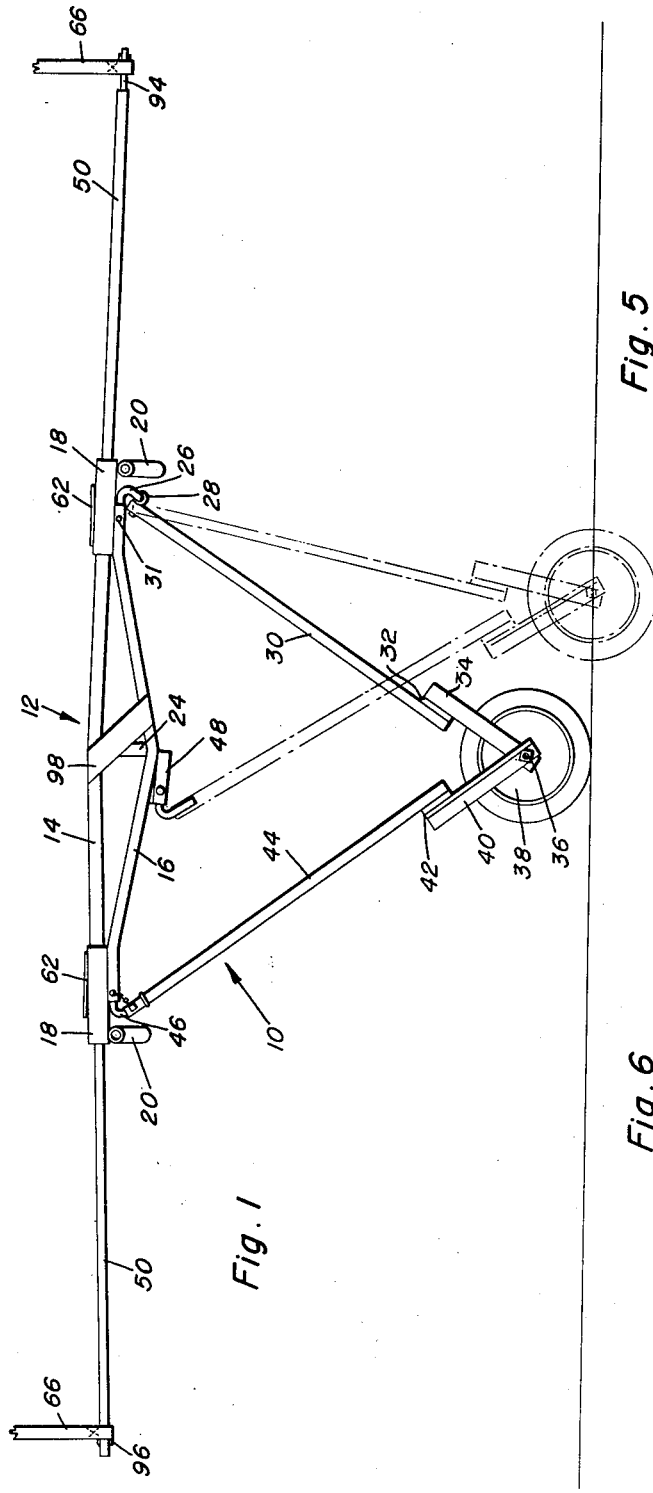
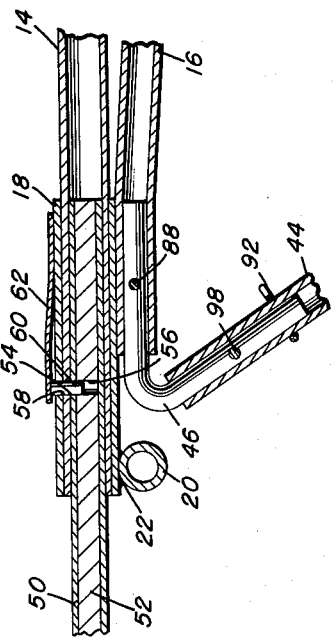
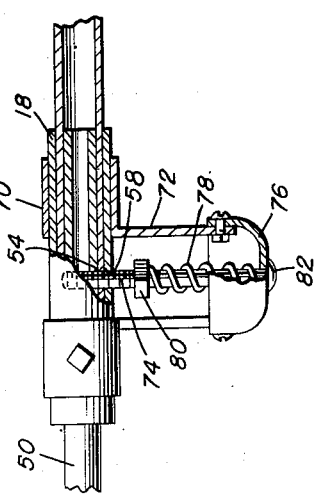
Ralph H. Goodale
INVENTOR.
BY *Clarence A. O'Brien*
*and Harvey B. Jacobson*
Attorneys Oct. 29, 1957          R. H. GOODALE          2,811,367
WHEELED FOLDABLE CARRIER
Filed Nov. 15, 1955                                3 Sheets-Sheet 2
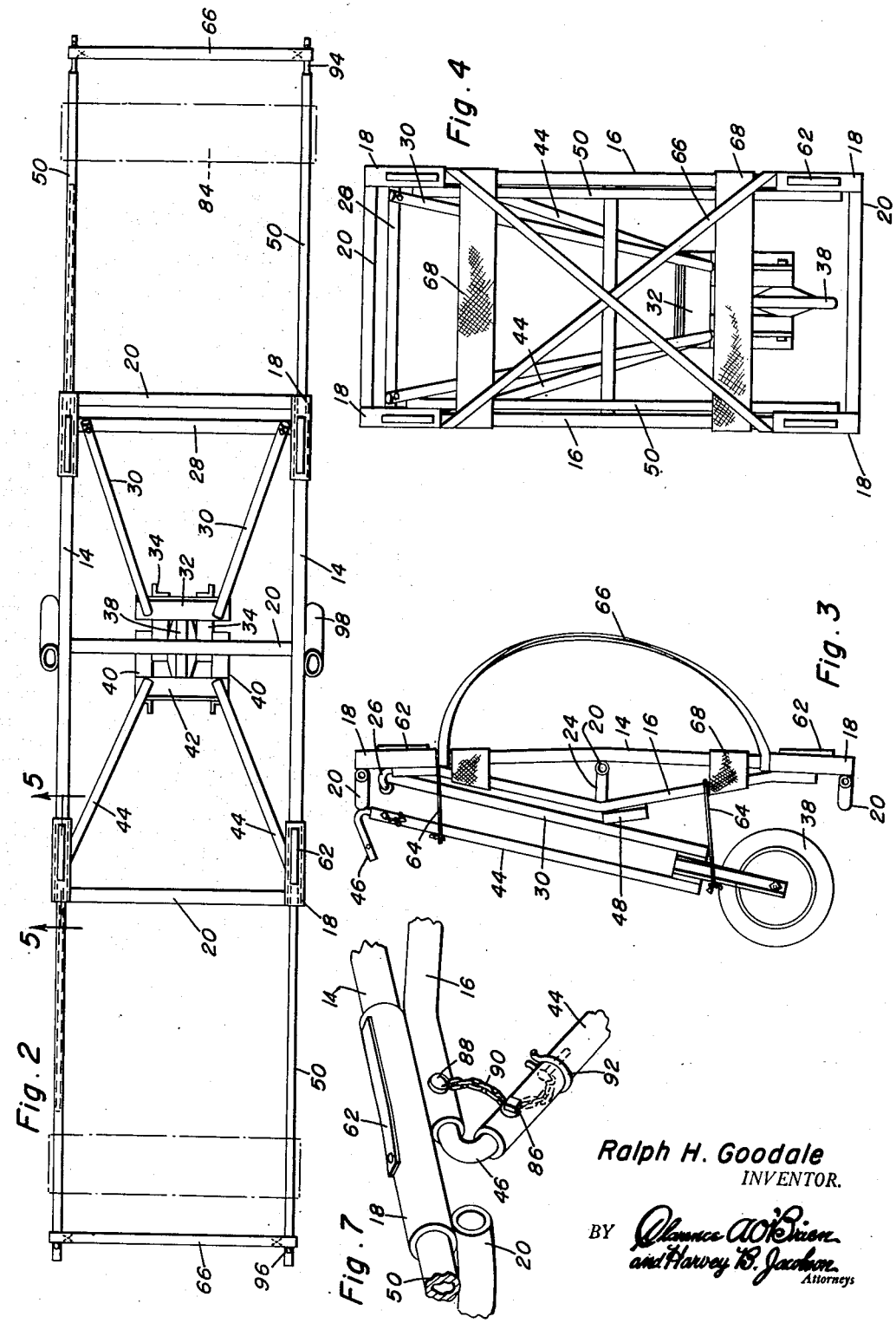
Ralph H. Goodale
INVENTOR.
BY *Clarence A. O'Brien*
*and Harvey B. Jacobson*
Attorneys Oct. 29, 1957 R. H. GOODALE 2,811,367
WHEELED FOLDABLE CARRIER
Filed Nov. 15, 1955 3 Sheets-Sheet 3

Ralph H. Goodale
INVENTOR.

BY *Clarence A. O'Brien*
*and Harvey B. Jacobson*
Attorneys

United States Patent Office 2,811,367
Patented Oct. 29, 1957

2,811,367

WHEELED FOLDABLE CARRIER

Ralph H. Goodale, Pomona, Calif.

Application November 15, 1955, Serial No. 546,861

4 Claims. (Cl. 280—41)

This invention generally relates to a carrier, and more specifically provides a device for carrying loads over rugged terrain which is constructed in such a manner as to be foldable and portable wherein the carrier may be easily transported for use after which it may be easily unfolded wherein a single wheeled carrier is provided, with the single wheel being disposed adjacent the center of the carrier for balancing thereof.

An object of the invention is to provide a one-wheeled foldable and portable carrier especially adapted for use in carrying animals, such as game, which have been killed as a result of hunting.

Another object of the present invention is to provide a one-wheeled carrier which may be used as a stretcher or a pack carrier wherein the device may be constructed for carrying several hundred pounds and is of lightweight construction wherein the device may be easily transported on the back of a person without interfering with the normal body functions of the person carrying the device, wherein the person may transport the device and still use his gun in normal hunting procedures.

A still further object of the present invention is to provide a carrier which is convertible for use by either one or two persons to increase the utility of the device.

Yet another important feature of the present invention is its simplicity of construction, ease of folding, lightweight construction, ruggedness, adaptation for many varied purposes, and its relatively inexpensive manufacture.

These together with other objects and adavntages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevational view of the one-wheeled carrier of the present invention;

Figure 2 is a top plan view of the construction of Figure 1;

Figure 3 is a side elevational view of the device in folded position with the carrying straps attached thereto;

Figure 4 is a front view of the consrtuction of Figure 3;

Figure 5 is a detailed sectional view taken substantially upon a plane passing along section line 5—5 of Figure 2 illustrating the manner of detachable engagement of the handle members and the upper end of the wheel supporting braces;

Figure 6 is a detailed sectional view illustrating a modified form of means for attaching the detachable handles.

Figure 7 is a detailed view of the acute angle connector and its associated structure;

Figure 8:
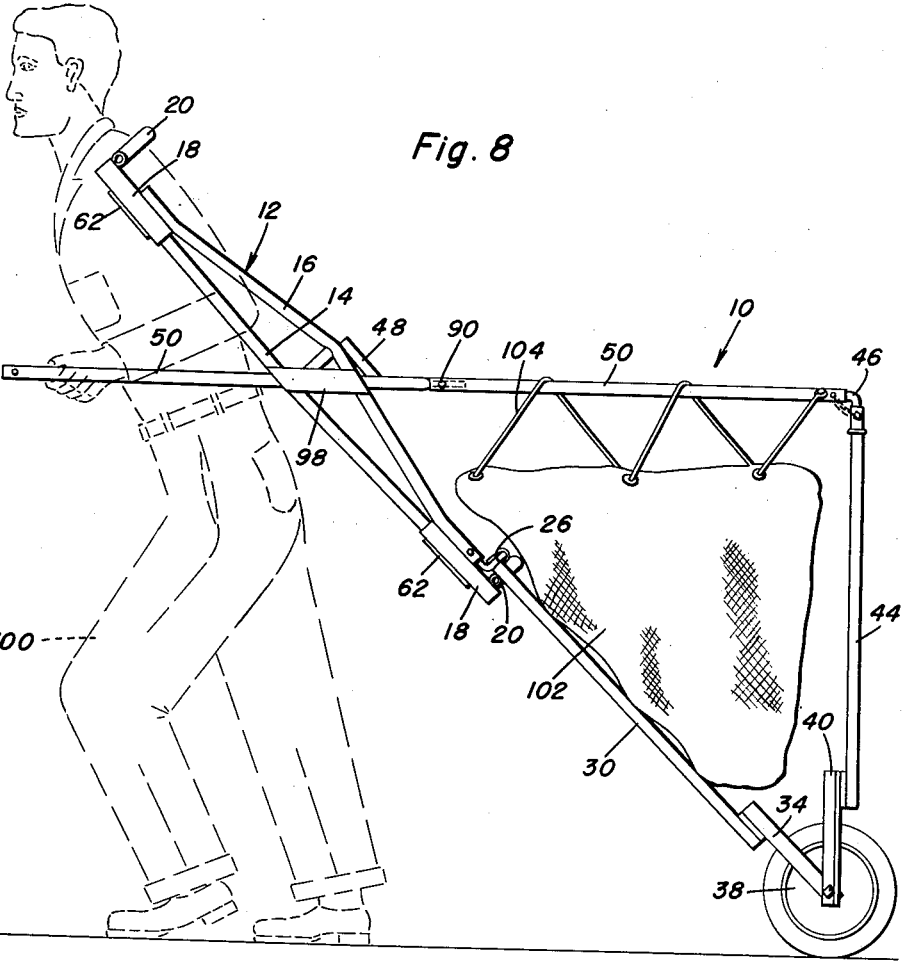
Figure 8 is a side elevational view of the carrier of the present invention converted for use by a single person.

Referring now specifically to the drawings, the numeral 10 generally designates the one-wheeled carrier of the present invention, including a frame generally designated by the numeral 12 wherein the frame has two pairs of upper and lower longitudinal rails designated by the numerals 14 and 16, respectively, wherein the upper rails 14 are generally straight, and the lower rails 16 are downwardly bowed, although it will be noted that the upper rails are slightly upwardly bowed. A tubular sleeve 18 is attached to each end of each of the upper rails 14 and the outer ends of the lower rails 16 are attached to the inner lower surface of the sleeves 18, thereby forming rigid connections between the upper and lower rails 14 and 16.

Interconnecting the upper rails 14 is a plurality of transverse rails 20 which are downwardly bowed, with the outermost rails 20 being attached to the outer lower ends of the sleeves 18, as by welding 22, or other suitable fastening means. The central cross-member 20 is connected to the center of the upper rails 14 and is also downwardly bowed at the center thereof. A brace member 24 is disposed between the outer ends of the central cross-member 20 and the center of the lower longitudinal rails 16, thereby forming a rigid frame which is constructed of tubular members so formed to provide a rigid and relatively lightweight frame 12 whereby the transverse members 20 are downwardly bowed or curved to provide a load carrying positioning arrangement.

Attached in one end of each of the lower longitudinal rails 16 is a Z-shaped rod 26 which has a transverse member 28 extending between the free ends thereof with a pair of depending converging supporting braces 30 attached to the transverse member 28 in a rigid manner, wherein the transverse member 28 generally forms a pivot axis for movement of the braces 30. The braces 30 are interconnected at their lower ends by a plate member 32 wherein the braces 30 together with the plate member 32 and the transverse member 28 form a substantial support for a pair of parallel angle iron members 34 through which is extended an axle 36 rotatably supporting a single support wheel 38. Also attached to the axle 36 is another pair of angle iron members 40 attached to a plate 42 interconnecting the lower ends of a pair of converging braces 44 which extend upwardly and are provided with an acute angled connector 46 at their upper ends wherein the acute angled connector 46 is inserted into the upper end of the braces 44 and the forward end of the lower longitudinal rails 16.

The lower longitudinal rails 16 are each provided with a tubular sleeve 48 mounted on the undersurface thereof in spaced relation to the ends for alternatively receiving the acute angled connector rod 46 wherein the supporting wheel 38 may be disposed in one of two positions illustrated in the full lines and in dotted lines in Figure 1 for a purpose described hereinafter.

Forming an extension from each of the sleeves 18 on the ends of the longitudinal rails 14 is an elongated tubular member 50 having a rod 52 therein wherein the tubular member 50 and the rod 52 are provided with aligned apertures 54 and 56, respectively, which may be disposed in alignment with an aperture 58 extending through the sleeve 18 and the tubular rail 14. An anchoring pin 60 mounted on the end of a flat spring 62 secured to the outer surface of the sleeve 18 projects into the aligned apertures 54, 56 and 58, thereby retaining the tubular handle 50 and the rod 52 in assembled relation in the sleeve 18, wherein retraction of the pin 60 will permit detachment of the elongated handle tubes 50.

When the device is folded for carrying, the braces 44 are disconnected from the members 16 and pivoted downwardly to a position underlying the braces 30, wherein the braces 30 are pivoted to a position closely underlying the frame 12 and suitable tie strings 64 encircle the frame 12 and the braces 30 and 44, thereby retaining the braces in compact folded position. A pair of crossed straps 66 are provided and are attached to remote ends of the longitudinal rails 14 adjacent the sleeves 18 wherein the device may be carried on the shoulders somewhat in the nature of a knapsack wherein the frame 12 and the braces 44 and 30 are disposed against the back of the person carrying the device. A pair of canvas webbing members 68 may be provided in encircling relation to the rail members 14 and 16 which engage the back of the person carrying the device, thereby forming a protector for the person's back and eliminating contact of the metallic frame members therewith, thereby providing a device which may be easily and comfortably carried relatively long distances since all of the tubular elements render the device relatively lightweight in construction. If desired, a canvas support member may be suspended within the longitudinal rails, and the extensions 50 thereof, thereby forming substantially a stretcher or the like, if desired. The concave construction of the transverse members 20 permits most relatively large game animals to be carried thereon, wherein a person at each end of the carrier may adequately control the device. When the persons at each end of the carrier are of different size, such as a man and a boy, the wheel 38 may be adjusted by positioning the connector 46 in one or the other of the sleeves 48 or the end of the longitudinal rails 16, thereby determining the fulcrum point of the frame 12, thereby determining the fulcrum point of the load carried on the frame 12 so that the load will be more proportionately distributed.

Figure 6 illustrates a modified form of means of attaching the elongated handle extension 50 wherein an adapter collar 70 surrounds the sleeve 18 and has a tubular boss 72 projecting therefrom with a movable pin 74 extending into the aligned apertures 58 and 54. The pin 74 is slidably received within the cap 76 and the tubular boss 72 and a compression coil spring 78 is disposed between the cap 76 and an abutment 80 on the pin 74, thereby normally urging the pin 74 inwardly into locking position. The pin 74 is provided with a headed portion 82 which may be gripped for retracting the pin 74 for permitting removal of the handles or extensions 50.

As illustrated in Figure 2, transverse members such as canvas, designated by the numeral 84, may be provided between the handles 50 for permitting portions of the load to be positioned thereon, if desired.

In further describing the invention, Figure 7 specifically illustrates a bolt 86 which rigidly secures the acute angled connector 46 to the upper end of the brace 44. The other end of the acute angled connector 46 is detachably secured in the end of member 16 or sleeve 48 by a removable pin 88 having a flexible chain 90 attached thereto with the flexible chain 90 having its other end secured to the bolt 86 for retaining the pin 88 with the respective brace 44 to prevent loss thereof. A spring clip 92 is provided on the brace 84 for retaining the pin 88 when in folded condition so that the pin 88 will not rattle and become entangled with other portions of the device.

Figure 10:
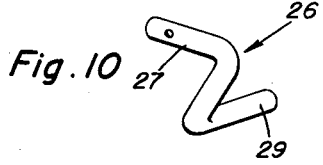
Figure 10 is a detailed perspective view of the Z-shaped connector bar.

Figure 10 of the drawings specifically illustrates the construction of the member 26 as an individual element which is substantially Z-shaped with the upper leg 27 being disposed in perpendicular relation to the lower leg 29 wherein the lower leg 29 is telescopically received within the tubular member 28. The upper leg 27 is received in the end of the tubular member 16 and is held therein by a suitable removable fastener 31. It will be understood that an acute angle member 46 and a Z-shaped member 26 is disposed at each side of the device for securely retaining the undercarriage formed by the braces 30 and 44 and the wheel 38 in proper position in relation to the supporting frame.

The free ends of one pair of the extension handle members 50 is provided with a reduced portion 94 while the other end thereof is provided with a socket having a removable bolt 96 therein wherein the straps 66 may be attached to the ends of the handle members 50 for supporting a portion of the carrier from the shoulders of the persons using the device.

As specifically illustrated in Figure 4 as well as in Figure 1, an inclined tubular sleeve 98 is provided on each side of the frame member 12 and extends between the side rails 14 and 16 for permitting conversion of the device from a two-man to a one-man carrier. It will be noted that the sleeves 98 are of a size to receive the extension handles 50.

Figure 9:
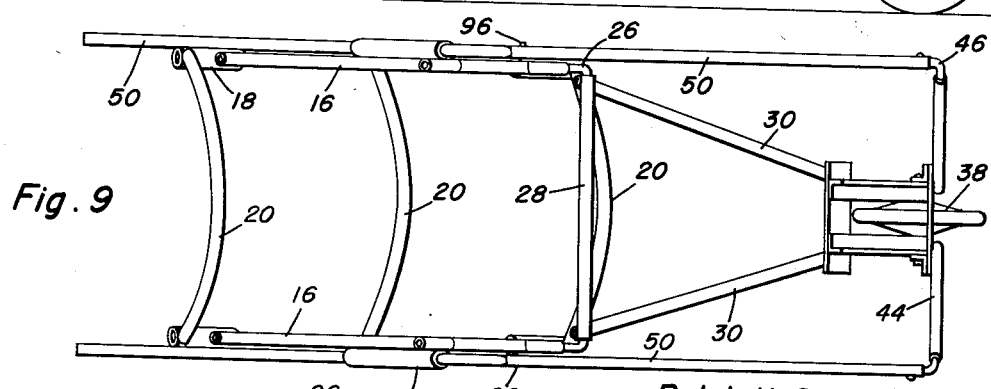
Figure 9 is a top plan view of the construction of Figure 8.

In converting the device from a two-man carrier to a one-man carrier, specific reference is made to Figures 8 and 9 of the official drawings. When the device is converted, the brace members 44 are disposed in vertical position and the extension handles 50 are detached from the frame 12. The extension handles 50 are disposed in longitudinal alignment with the reduced end portion 94 secured within the socket end of the other handles 50 by fastening bolts 96. The acute angle connections 46 are then inserted into the end of one of the handle extensions 50 and are retained therein by the removable pin 88 which engages the aperture 54 which normally receives the pin 60. The carriage 12 is pivoted to an upwardly inclined position substantially in alignment with the braces 30 and extends along the rear surface of the back of a person 100 utilizing the carrier 10. A canvas load carrying member 102 may be suspended from the handle members 50 by suitable ropes or string 104 thereby permitting a load to be carried by the device. As illustrated in Figure 8, a person grasps the free ends of the handles 50 extending through the sleeves 98 with the frame 12 extending rearwardly of the shoulders wherein the device may be pulled over relatively rugged terrain for transporting relatively light loads or for carrying the device to a desired location after which it may be converted to a two-man carrier thereby eliminating the necessity for actually carrying the load of the device as illustrated in Figure 3.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A foldable and portable carrier comprising an elongated generally rectangular frame, a first pair of depending braces pivotally attached to said frame, a second pair of depending braces removably attached to said frame, a wheel supported from the lower end of said braces with the braces being pivotal in relation to each other for folding to a position underlying the frame and superposed in relation to each other, said frame having a pair of longitudinally spaced and aligned tubular sockets, said second braces being tubular, and an acute angled rod connector selectively attaching the upper ends of the second braces to the frame at longitudinally spaced points for varying the position of the wheel for vertically adjusting the frame and changing the longitudinal position of the wheel for varying the balance point of the frame, said frame including upper and lower longitudinal rails with the sockets formed on the lower rails, transverse rails interconnecting the upper rails, tubular sleeves on each end of each upper rail, an elongated handle mounted in each sleeve, and means for releasably retaining said handles in said sleeves.

2. A foldable and portable carrier comprising an elongated generally rectangular frame, a first pair of depending braces pivotally attached to said frame, a second pair of depending braces removably attached to said frame, a wheel supported from the lower end of said braces with the braces being pivotal in relation to each other for folding to a position underlying the frame and superposed in relation to each other, said frame having a pair of longitudinally spaced and aligned tubular sockets, said second braces being tubular, and an acute angled rod connector selectively attaching the upper ends of the second braces to the frame at longitudinally spaced points for varying the position of the wheel for vertically adjusting the frame and changing the longitudinal position of the wheel for varying the balance point of the frame, a pair of crossed shoulder straps attached to said frame for carrying the device, and a pair of transverse cushions on the frame for engaging the back of the person carrying the device, said frame including upper and lower longitudinal rails with the sockets formed on the lower rails, transverse rails interconnecting the upper rails, tubular sleeves on each end of each upper rail, an elongated handle mounted in each sleeve, and means for releasably retaining said handles in said sleeves.

3. A foldable and portable carrier comprising an elongated generally rectangular frame, a first pair of depending braces pivotally attached to said frame, a second pair of depending braces removably attached to said frame, a wheel supported from the lower end of said braces with the braces being pivotal in relation to each other for folding to a position underlying the frame and superposed in relation to each other, said frame having a pair of longitudinally spaced and aligned tubular sockets, said second braces being tubular, and an acute angled rod connector selectively attaching the upper ends of the second braces to the frame at longitudinally spaced points for varying the position of the wheel for vertically adjusting the frame and changing the longitudinal position of the wheel for varying the balance point of the frame, said frame including upper and lower longitudinal rails with the sockets formed on the lower rails, transverse rails interconnecting the upper rails, tubular sleeves on each end of each upper rail, an elongated handle mounted in each sleeve, and means for releasably retaining said handles in said sleeves, said retaining means including a spring urged pin positionable in aligned apertures in the sleeve and handle.

4. The combination of claim 3 wherein a pair of inclined sleeves are disposed on said frame for receiving said handles when the handles are disposed in substantially horizontal position with the frame in inclined position with the first pair of braces forming a continuation of the frame and the second pair of braces being generally vertical and detachably connected to the rear of said handles whereby the free ends of the handles extend forwardly of the frame for pulling the carrier.

References Cited in the file of this patent

UNITED STATES PATENTS

| 547,288 | Remington | Oct. 1, 1895 |
| 2,416,492 | Neeley | Feb. 25, 1947 |
| 2,546,604 | Lafky | Mar. 27, 1951 |

FOREIGN PATENTS

| 899,145 | Germany | Dec. 7, 1953 |